US005643395A

United States Patent [19]

Hinton

[11] Patent Number: 5,643,395

[45] Date of Patent: Jul. 1, 1997

[54] AUTOMATIC SPLICING APPARATUS

[75] Inventor: Gaylen R. Hinton, Merced, Calif.

[73] Assignee: CMS Gilbreth Packaging Systems, Inc., Trevose, Pa.

[21] Appl. No.: 939,894

[22] Filed: Sep. 1, 1992

[51] Int. Cl.$^6$ .......... B32B 35/00; B65H 21/00

[52] U.S. Cl. .......... 156/361; 156/367; 156/378; 156/502; 156/504; 242/552; 242/554.1; 242/554.5

[58] Field of Search .......... 156/502, 504, 156/350, 351, 361, 367, 378, 363, 366; 242/57, 75.52, 552, 554.1, 554.5

[56] References Cited

U.S. PATENT DOCUMENTS

| | | | |
|---|---|---|---|
| 4,116,399 | 9/1978 | Mosburger | 156/504 X |
| 4,264,402 | 4/1981 | Morgan | 156/506 |
| 4,351,679 | 9/1982 | Dreher | 156/70 |
| 4,390,388 | 6/1983 | Nagata et al. | 156/351 |
| 4,460,430 | 7/1984 | Kissell et AL. | 156/504 |
| 4,497,454 | 2/1985 | Woodley | 242/56 R |
| 4,643,783 | 2/1987 | Hogenson | 156/504 X |
| 4,657,198 | 4/1987 | Shimuzu et al. | 242/57 |
| 4,878,982 | 11/1989 | Ogata et al. | 156/361 |
| 4,913,366 | 4/1990 | Andou | 242/57 |
| 5,032,211 | 7/1991 | Shinno et al. | 156/361 |
| 5,045,134 | 9/1991 | Schenker et al. | 156/504 X |
| 5,064,448 | 11/1991 | Choi | 55/38 |
| 5,064,488 | 11/1991 | Dickey | 156/504 X |
| 5,066,345 | 11/1991 | Long et al. | 156/157 |
| 5,066,346 | 11/1991 | Long et al. | 156/157 |
| 5,223,069 | 6/1993 | Tokuno et al. | 156/504 X |
| 5,261,618 | 11/1993 | Meschi | 242/57 X |

*Primary Examiner*—James Engel
*Assistant Examiner*—M. Curtis Mayes

[57] ABSTRACT

An apparatus for splicing the leading label in a roll of labels to one of the last labels in a second roll. The second roll, depleted because the labels are applied to articles in an assembly line, has photosensitive device that registers this depletion as the second roll is consumed. The device initiates splicing the leading label to a label in the depleted roll. A controller also responds to the device by moving the dancer arm to a predetermined position in order to control the registration of the leading label with the last labels in the second roll. The controller also responds to a count of the labels that are in the web between the production line and the splice in order to identify the article to which the splice has been applied to eject that article from the production line.

1 Claim, 3 Drawing Sheets

AUTOMATIC SPLICING APPARATUS

TECHNICAL FIELD

This invention relates to apparatus for splicing labels and, more particularly, and apparatus for automatically splicing a fresh roll of packaging labels to the terminal portion of a depleted roll of labels in order to permit uninterrupted application of these labels to the packaging, and the like.

BACKGROUND ART

High speed packaging machinery is essential to meet large demands for consumer products in a market-oriented economy. As a consequence, there is a need for machinery that can satisfy mass market packaging requirements swiftly, inexpensively and without interruption. Machinery of this character also must satisfy further needs, among which, safe and reliable operation by relatively unskilled production personnel are typical.

Drawing labels from a preprinted roll and applying these labels to a row of articles that are moving along a production line at high speed is a relatively common production activity. Difficulties arise, however, in making a transition to a fresh roll of labels as the roll in use is depleted, and an illustrative apparatus for splicing a fresh roll of labels to a depleted roll is described in U.S. Pat. No. 5,064,488, granted Nov. 12, 1991 to D. M. Dickey.

There are, however, further needs and among these is the need to reduce production costs by providing a splicing apparatus that does not require the presence of an attendant to initiate or help in the actual splicing process.

Label "registration" during roll changeover also is a most important matter. Thus, as a fresh roll of labels is fed into the packaging machinery, it is essential that each of these labels is severed from the web of labels that is drawn from the fresh roll precisely at the margin separating one label from the next label in the sequence on that web. Only a little imagination is required to picture the waste and expense that will result if labels are severed from a roll at some place other than at the predetermined line of severance and the labels, so mutilated, are applied to the articles moving along the production line.

To swiftly identify those articles in the array on the production line to which a spliced label has been applied is also quite important. The adhesive strip, ordinarily used to attach the leading label in the web drawn from a fresh roll to one of the last labels in the depleted roll, necessarily will be applied to one of the articles moving through the production line. The adhesive strip mars the appearance and salability of the article to which it is attached. For these reasons, the articles to which adhesive strips are applied must be identified and taken from the production line to permit the adhesive strip and the attached label to be removed from the article. After removal, the article is reinserted into the production line and a new label is applied. To locate one article to which an adhesive strip has been attached in an entire production run, however, is a painstaking and time consuming job.

There are, of course, any number of other criteria that a fully acceptable label splicing apparatus should meet. Maintenance and the number of moving parts in the apparatus, for example, should be minimal.

None of these requirements for an acceptable label splicing apparatus have been fully satisfied in the prior art. As a consequence, there still is a need for a more satisfactory apparatus that automatically detects a near-depleted condition in a roll of labels and causes a fresh label roll to be spliced to the web of labels that have been drawn from the end of the depleted roll. Further, completely adequate techniques to commence drawing labels from the fresh roll, while keeping these labels on the new web in registry with the last of the labels on the web from the depleted roll without introducing an undesirable interruption in production and clearly identifying the article to which the adhesive strip is attached also have not yet been provided.

DESCRIPTION OF THE INVENTION

These and other problems associated with splicing devices are overcome, to a great extent, through the practice of the invention.

Illustratively, on a reel that supports a roll of labels, a radial slot is formed in the flange near the reel ale. A photosensitive device, mounted on the splicer frame and in alignment with the slot responds to light reflected from the flange, and the edge of the layers of as yet unused labels that are exposed in the slotted area. As the roll is depleted, however, and the layers of labels exposed in the slotted area are drawn off, a void develops in the slot causing the reflectivity of the slotted area to change. This change in reflectivity from the slot produces a signal in the photosensitive device indicating that the roll of labels is nearing its end.

The low label condition identified through the signal from the photosensitive device can produce, in accordance with another aspect of the invention, several results. This low label signal initiates a counting sequence in a programmable logic controller in which each of the "counts" correspond to an individual label or machine cycle. After a predetermined number of counts have occurred, a member that controls the tension in the web of labels that is being drawn from the roll, the "dancer arm," is raised to a specifically determined splice position to insure that the leading label in the new roll is spliced in exact registration with one of the last labels in the depleted roll.

After the splice is completed, the counting sequence continues until the spliced label that carries the now undesirable adhesive strip has advanced through the discharge end of the labelling mechanism, where the counter then initiates the automatic ejection of the labelled article from the production line.

Thus, the invention provides an automatic apparatus that enables one attendant to service several splicing machines in a manner that does not interrupt production, that registers the labels on the replacement roll with the last labels on the depleted roll and that unmistakably identifies the article in the product line bearing the spliced label. Further in this same respect, the splicing machinery is safe and relatively simple to operate, requires few moving parts and is easy to maintain.

DETAILED DESCRIPTION OF THE INVENTION

Figure 1:
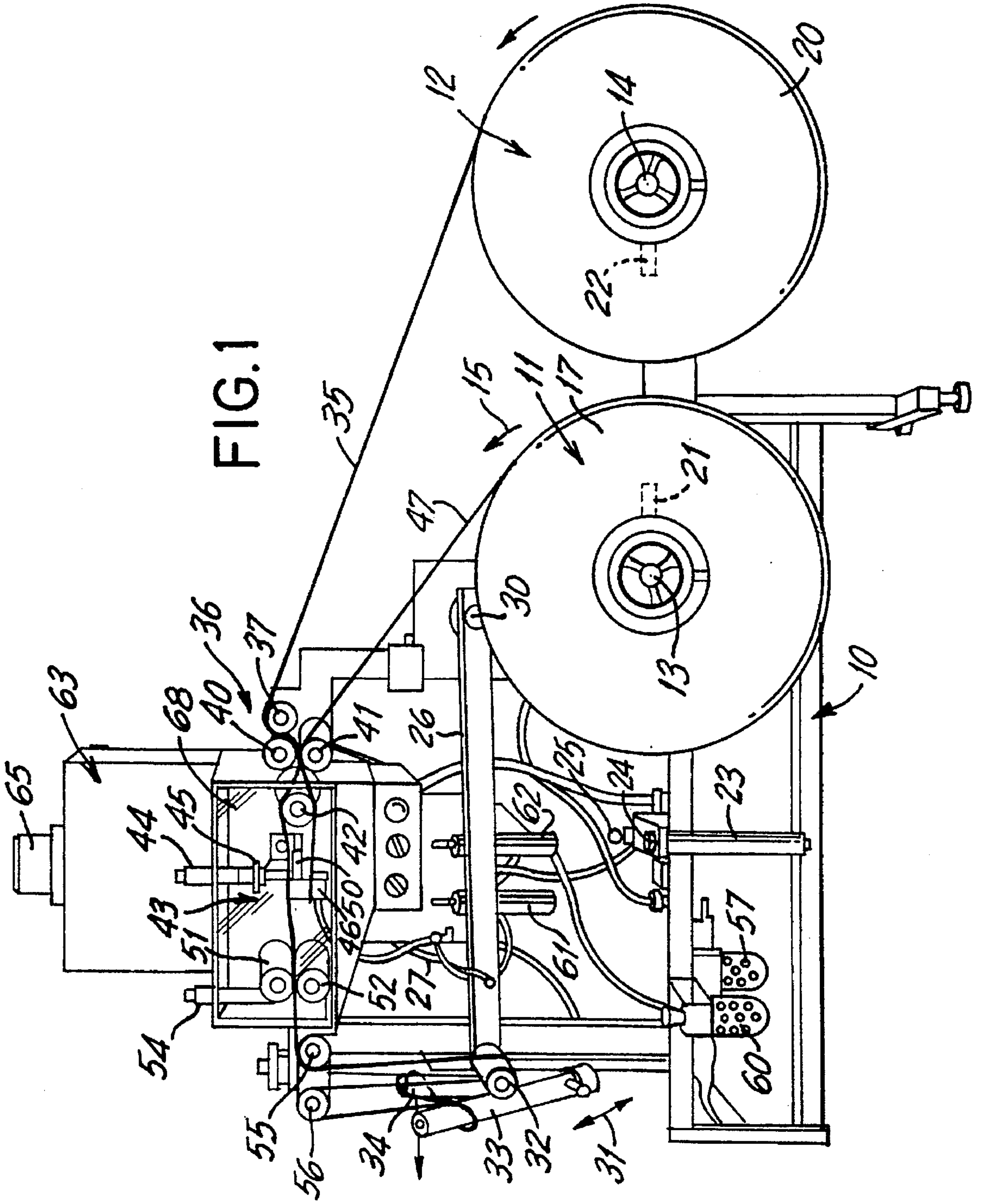
FIG. 1 is a front elevation of a splicing apparatus that characterizes the invention.

For a more complete understanding of the invention, attention is invited to FIG. 1. As illustrated, a frame 10 supports a pair of reels 11, 12, both for free rotation about respective axles 13, 14 in the directions of arrows 15, 16. The reels 11, 12 also include vertically disposed flanges 17, 20, respectively, in which each of these flanges is rigidly attached to its associated axles 13, 14. According to a salient aspect of the invention radially disposed slots 21, 22 are formed in each of the respective flanges, 17, 20, the innermost ends of these slots being next to, or spaced just a short radial distance from the corresponding axles 13, 14. To accommodate label rolls of different diameter, moreover, several radially oriented slots can be formed in the flanges 17, 20.

Also secured to the frame 10, and illustrative of another feature of the invention, is a pneumatic cylinder 23, mounted vertically on the frame 10. As shown, the cylinder 23 has a piston rod 24, the uppermost end of which is secured to a vertically adjustable roller 25 formed from Delrin, or other suitable material. The combined vertical stroke of the piston rod 24 and the adjusted vertical height of the roller 25 is equal to the distance between the top of the roller 25 and the bottom surface of a "dancer" arm 26 in the generally horizontal disposition shown in FIG. 1, when the arm 26 is engaged by a hook 27 that is secured to the frame 10.

The dancer arm 26 is attached to the frame 10 by means of a pivot 30 that enables the free end of the arm, when not engaged either by the hook 27 or the roller 25, to move in the directions of the arcuate arrow 31. A further roller 32 is attached to the free end of the arm 26 in order to protrude perpendicularly from the arm, in a horizontal plane.

Another roller 33 is secured to the frame 10 next to the dancer arm roller 32. The roller 33, however, protrudes upwardly from the frame 10, forming an angle of about 45° with the vertical member of the frame to which it is attached. A further frame roller 34 also is attached to the frame 10. The axis of the frame roller 34, however, is vertical.

At the top of the frame 10, an array of four horizontally disposed web rollers 36 are mounted in which a web of labels 35 from a depleting roll on the reel 12 is threaded over the top of first roller 37, through the gap formed between first roller 37 and a second roller 40, through the gap between the second roller 40 and a lower roller 41 and over the top of a separating roller 42 in order to pass through a splicing station 43.

At the splicing station 43, a vertically mounted upper pneumatic ram 44 moves an upper film pad 45 vertically. The film pad 45, moreover, has a perforated surface (not shown in the drawing) that can selectively apply suction to the upper surface of the web 35 during splicing operations. In a similar manner, a perforated lower film pad 46, also vertically movable under the control of a lower pneumatic ram (not shown in the drawing), applies suction to the leading edge of a web of labels 47 from a full replacement roll on the reel 11. Not shown in the drawing is a strip of adhesive secured to the underside of the portion of the web 47 that is held on the lower film pad 46 by means of suction. The adhesive strip, moreover, protrudes forward of the leading edge of the web 47 with its adhesive side disposed upwardly, or vice versa if the opposite reel is being spliced, toward the web 35.

A web cutter 50 is secured behind the upper and lower film pads 45, 46 to cut the web that is being drawn from a depleted roll as described in U.S. Pat. No. 5,064,488. In any event, the web 35 extends from the splicing station 43 through the gap between an upper horizontally disposed stabilizing roller 51 and a horizontally disposed, but vertically aligned, lower stabilizing roller 52 and between the jaws of a web brake 53 that is controlled by means of a pneumatic brake cylinder The web 35, after passing through the jaws of the brake 53 then is drawn over a horizontal infeed roller 55 that is mounted on the frame 10 and under the roller 32 on the dancer arm 26 for tension adjustment. The web 35 then proceeds over a horizontal outfeed roller 56, also mounted on the frame 10, that is in the same plane as the infeed roller 55. In order to twist the web 35 gently from its flat orientation as it is drawn from the depleted roll of labels into a vertical orientation in which the labels can be applied to an array of articles that are moving through a production line (not shown in FIG. 1), the web 35, as it comes from the outfeed roller is passed around a turning bar 33 that is secured at a 45° angle to the vertical members of the frame 10. Before leaving the splicing machine, the web 35, now twisted toward the vertical by the turning bar, completes its transition to a vertical orientation by passing around the vertical roller 34.

As mentioned above, many of the movable elements that characterize the embodiment of the apparatus shown in FIG. 1 are pneumatically operated. To provide the pneumatic pressures required to activate the cylinders 23, 44, 54, an air filter 57 is attached to the frame 10 to supply air for pressurization and for application to these cylinders. Because the air cylinder 23, the cylinders that move the upper and lower vacuum film pads 45, 46, the web brake 54 and an ejection cylinder 72 (FIG. 3) also require lubricated air, an oil mist lubricator 60 also is attached to the frame 10 close to the air filter 57.

It will be recalled that the upper and lower film pads 45, 46 apply suction to the label webs 35, 47, respectively. The low air pressure required to establish this suction is provided by means of a pair of pneumatic venturi type vacuum generators 61, 62, also secured to the frame 10.

Figure 4:
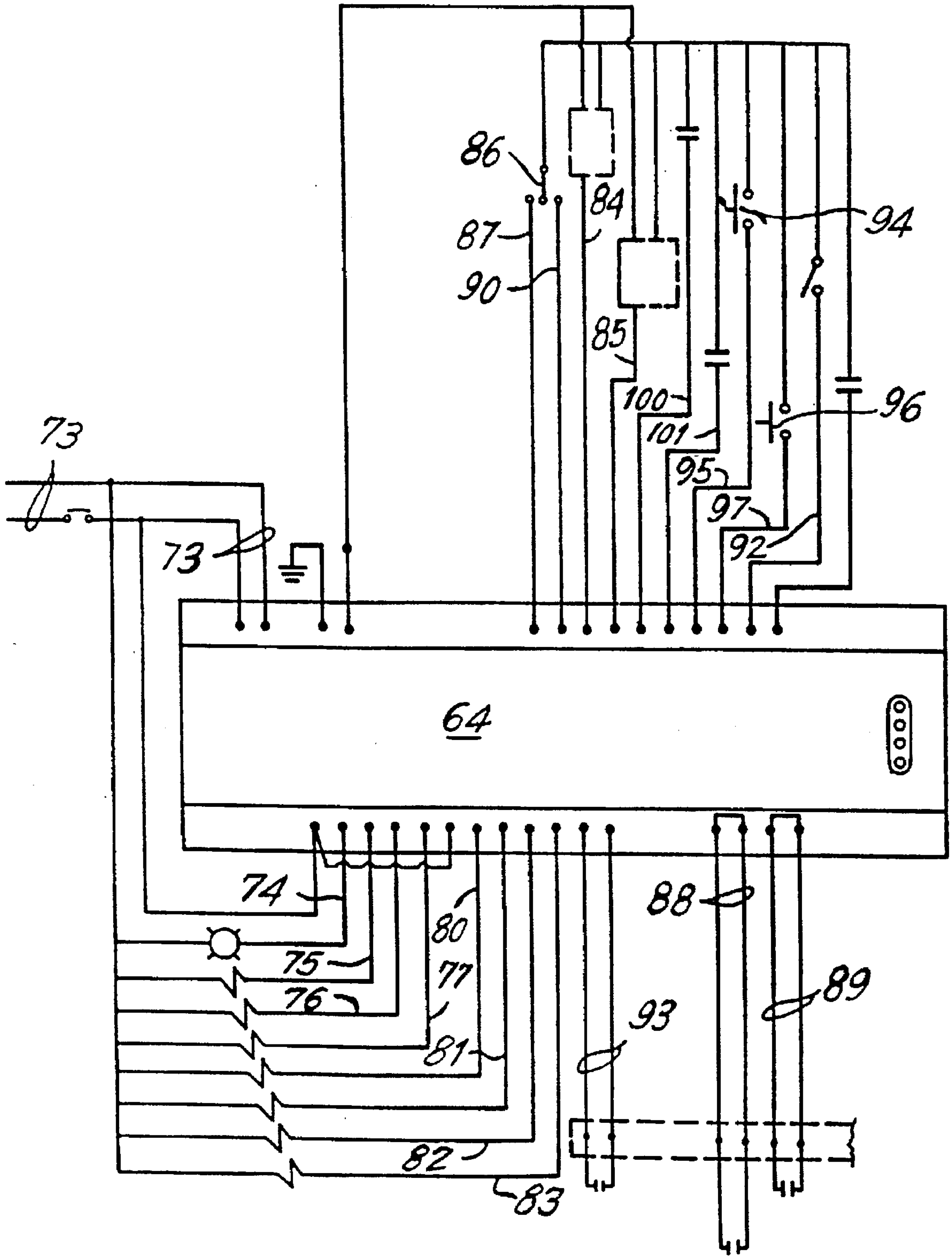
FIG. 4 is a wiring diagram for the apparatus shown in FIGS. 1 to 3, above.

An electrical equipment cabinet 63 houses a programmable logic controller 64 (FIG. 4). For the purpose of this invention, several parameter settings should be applied to the controller 64. Among the more significant criteria that should be programmed into the controller 64 are label length, maximum speed and certain line conditions. Also among these settings are "Max speed" [the highest speed of which the machine is capable +10%, i.e., if the machine's top speed is 1000 cycles per minute (CPM), the "Max speed" is 1100 CMP] and "Decel time"(the time it takes the machine to ramp down from "Max speed" to base speed). As shown in FIG. 1, moreover, a low roll warning light 65 is mounted on the top of the cabinet 63 in order to flash on and off, as appropriate, to warn the machine attendant that the splicing process is in operation.

Figure 2:
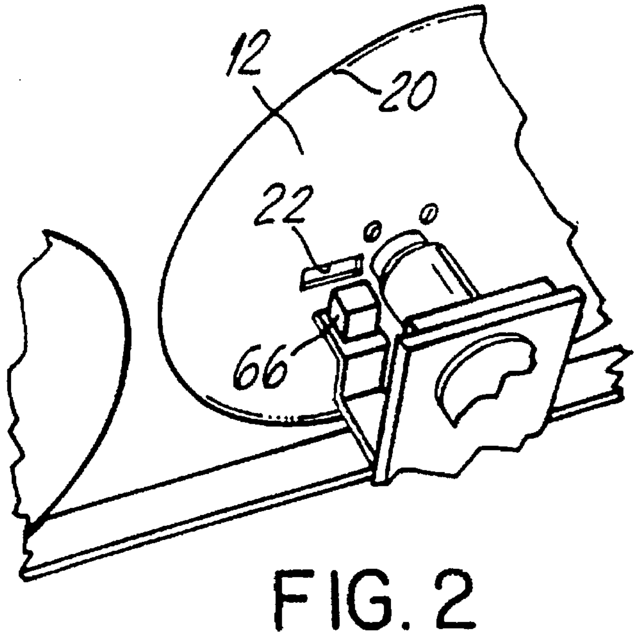
FIG. 2 is a perspective view of a portion of a reel for use in connection with the embodiment of the invention shown in FIG. 1.

As best shown in FIG. 2, the radial slot 22 on the flange 20 rotates, with each revolution of the flange into alignment with light from a convergent beam photosensitive device 66. As shown, a beam of light, emitted from the device 66, is reflected from the bright metal flange 20 and a similarly reflective portion of layered edges on the fresh roll of labels that are exposed in the aperture of the slot 22. Attention is invited to the fact that it is necessary to adjust the photosensitive device to the darkest colored label roll among a sequence of label rolls that are to be expended. This occurs because the device 66 receives a higher intensity of reflected light from brighter labels, in contrast to a lower intensity that is reflected from darker colored labels. This adjustment is made, preferably, through manipulation of a potentiometer (not shown) that is in circuit with the photosensitive device 66. In these conditions, the signal from the photosensitive device remains essentially constant. As the roll of labels, however, nears depletion, the web of labels is unwound from the roll, exposing a void space in the slot 22 in which the reflectivity within the slot changes markedly, thereby producing an output signal in the photosensitive device 66 that indicates a roll that is near full depletion.

Figure 3:
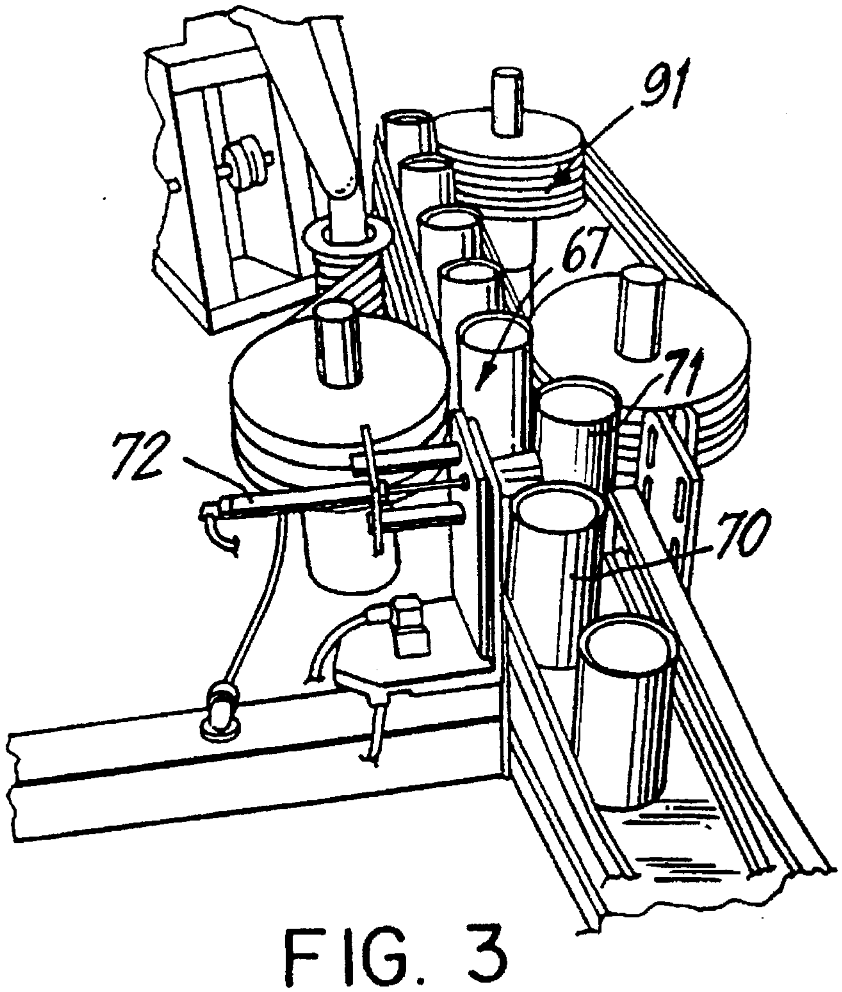
FIG. 3 is a perspective view of a typical mechanism for use in connection with the apparatus shown in FIG. 1 that ejects articles that have spliced labels attached from the production line.

Attention now is invited to FIG. 3 which shows a production line 67 through which a line of articles 70, 71 are moving, each of the articles to receive one of the labels from the splicing machine under consideration. It will be recalled that an adhesive strip, as described in U.S. Pat. No. 5,064,488, is required to splice the fresh roll of labels to one of the last labels in the depleted roll. This label with the attached adhesive strip proceeds through to the production line 67 and is applied to the article 71. To identify the article 71, so labelled, in order to enable service personnel to remove the undesired label and return the article to the production line for fresh labelling, the pneumatic ejection cylinder 72 is activated to drive the article 71 out of the production line 67. The operation of the ejection cylinder 72, moreover, is regulated by the programmable logic controller 64 (FIG. 4) which counts down the number of labels from the splice to the production line 67 and, as described subsequently in more detail, expels the article 71 to which the marred label is applied.

Turning once more to FIG. 4, electrical power is applied to the controller 64 through a pair of conductors 73. Although not shown in any of the drawings, the valves that admit air under pressure to the pneumatic cylinders, or that apply vacuum to the upper and lower film pads 45, 46 (FIG. 1), all are operated under the control of electrically activated solenoids. Consequently, electrical signals in output conductors from the controller 64 regulate the operation of the various splicer components according to the following table:

| Controller Output Conductors | Splicer Component |
|---|---|
| 74 | Warning light 65 |
| 75 | Upper film pad 45 vacuum |
| 76 | Dancer arm pneumatic cylinder 23 |
| 77 | Web brake pneumatic cylinder 54 |
| 80 | Lower film pad 46 vacuum |
| 81 | Top splice pneumatic ram 44 |
| 82 | Bottom splice pneumatic ram (not shown) |
| 83 | Pneumatic ejection cylinder 72 |
| 88 | Unwinding reel 12 electromagnetic brake |
| 89 | Label application machine 91 (FIG. 3) speed control |
| 93 | Label application machine 91 (FIG. 3) deactivation signal |

Input signals, moveover, are applied to the programmable controller 64 through conductors and sensing devices enumerated in the following table:

| Splicer Component | Controller Input Conductor |
|---|---|
| Reel 11 photosensor 66 (not shown) | 84 |
| Reel 12 photosensor 66 | 85 |
| Reel feed select switch 86 | 87, 90 |
| Splicer safety guard (clear plastic cover 68) | 92 |
| Automatic and manual operation selection switch 94 | 95 |
| Reset switch 96 | 97 |
| Label feeding signal | 100 |
| Label application machine 91 (FIG. 3) cycle counting signal | 101 |

In operation, as the roll of labels on the reel 12 (FIG. 2) is nearing depletion, each rotation of the reel 12 draws a layer of the web 35 from the roll, reducing the diameter of the portion of the roll remaining on the reel 12. Eventually, as successive layers are drawn from the roll, a progressively greater area of the slot 22 is exposed, changing the reflectivity of the slot 22 as it passes the light beam emitted from the convergent beam photosensitive device 66. This difference in reflectivity is registered through a light-sensitive component within the device 66 as a change in the output signal that is applied to the conductor 85 (FIG. 4). The controller 64 responds to this roll depletion signal in several ways. Typically, the controller 64 sends a signal through the conductor 74 to activate the warning light 65 (FIG. 1) to inform the machine attendant that a splice is in process. A signal also is sent from the controller 64 (FIG. 4) through the conductor 89 at the appropriate time, as determined by the speed of operation, the label length, "max speed," and deceleration rate, to decrease the speed of the label application machine 91 to a low speed, e.g., 60 revolutions per minute. The controller 64 calculates exactly when to start slowing down the machine, so that when the machine has finally decelerated to its lowest speed, there always remains the same quantity of labels left on the reel regardless of initial speed.

A machine cycle, or revolutions counter, also is enabled within the controller 64 through the signal in the conductor 85. The counter responds to a predetermined number of pulses in the conductor 100 from the label application machine 91 by activating pneumatic cylinder 23 (FIG. 1) to drive the piston rod 24 vertically upward, pressing the roller against the lower surface of the dancer arm 26 and to cause that arm to pivot into a preselected position, of which the horizontal position shown in FIG. 1 is typical. By pressing the dancer arm 26 into this preselected position, variation is eliminated in the length of the web 35 that is held between the label application machine 91 (FIG. 3) and the web cutter 50. In this way, splicing will be made with the labels in the web 47 from the fresh roll being in registration with the labels in the web 35 from the depleted roll. Thus, the length of the web 35 between the brake 53 and the label application machine 91 is always constant during splicing.

Illustratively, the controller 64 is programmed to satisfy operating condition, and the following is a typical specimen calculation for these operating conditions.

There is a ten second calculation time that occurs before the machine ramps down to slower speeds to accomplish a splice. The first seven seconds insure that the machine is operating at a steady speed and, in the last three seconds, a counter counts the number of labels that have passed through the machine in that time. Assuming that the machine is operating at "Max speed," the number of labels passed through the machine in ten seconds are:

$$\frac{\text{Max Speed} \times 10}{60} = \frac{\text{Max Speed}}{6}$$

where speed is in cycles per minute.

As the machine decelerates, the number of labels that pass through the machine until fully decelerated is equal to:

½× speed×Decel time assuming that the deceleration rate is linear.

The "Decel time," however, is proportioned to the speed of the machine. For example, if the machine is operating at half speed, it will only take one half of the time to decelerate as it would have taken to decelerate from "Max speed." Consequently, $$\text{“Decel time”} = \frac{\text{speed}}{\text{Max speed}} \times \text{machine deceleration setting}$$

Therefore, the number of labels that are used udring the time of deceleration are:

$$1/2\ \text{speed} \times \frac{\text{speed}}{\text{Max speed}} \times \text{machine deceleration setting}$$

and this is equal to:

$$\frac{(\text{speed})^2\ (\text{machine deceleration setting})}{2 \times \text{Max speed}}$$

Converting the above speed value into the number of labels that are counted during a three second period, the number becomes:

3×speed

Consequently, if 3×speed is substituted for speed in the foregoing formula, the equation must then be divided by 9 (the square of 3) in order to maintain equality. Further, to convert the equation into terms of cycles per second, the equation now becomes:

Labels passed during deceleration =

$$\frac{(3 \times \text{speed})^2\ (\text{machine deceleration setting})60}{2 \times 9 \times \text{Max speed}} = \frac{(3 \times \text{speed})^2}{\text{Divide } K}$$

where $$\text{Divide } K = \frac{.3\ (\text{Max speed})}{\text{machine deceleration setting}}$$

The “divide K” constant is loaded into the controller 64.

Further, if the machine is operating at “Max speed,” the “Decel time” is equal to the machine deceleration setting. In this circumstance, the number of labels passed during deceleration is:

$$\text{Subtract } K = \frac{(\text{Max speed})\ (\text{Decel time})}{120}$$

The “Subtract K” constant also is loaded into the controller 64.

A program setting that corresponds to the longest label to be run at the fastest speed is calculated through the following expression:

$$\frac{(\text{Max speed})\ (\text{Decel time}/2 + 10)}{60}$$

The value of the immediately foregoing expression, identified as C60, is the total number of labels passing through the machine between the first low label signal registered in the photosensitive device 66 (FIG. 2) and the time at which the dancer arm 26 (FIG. 1) begins to rise.

The controller 64 subtracts the number of labels that would be used during deceleration at the actual machine speed from the “Subtract K” value, that is, the maximum possible number of labels that could pass through the machine during that same time. This difference is identified as C65.

Upon calculating the C65 difference, the controller 64 permits the machine to continue operation at normal speed while counting down the C65 value with each passing label. When C65 is counted down to zero, the controller 64 starts to decelerate the machine to the base speed (e.g. 60 rpm).

The C65 count-down insures two important results. First, it insures that when the dancer arm 27 (FIG. 1) begins to rise (which starts the balance of the splice sequence) the machine will be operating at its base speed. The second important result attendant upon the C65 count-down insures that without regard to the initial actual machine speed, the time required for the splicing sequence will always be a minimum. This last result is achieved because the machine is allowed to operate at its normal speed until the last possible instant. Further in this connection, when coupled to the correct setting for the photosensitive device 66, there will be a minimum waste of leftover and unused labels on the reel 12.

It should be noted, moreover, that this C65 count-down is completely independent of the C60 value as that value is derived above, and it is the C60 value that actually initiates the splice sequence. Nevertheless, if these values, C60 and C65, are entered into the controller 64 correctly, they will always be properly timed with respect to each other.

Hook 27 is used to set the proper web length if a manual splice is made.

A few seconds after the dancer has been positioned, the machine cycle count in the conductor 100 (FIG. 4) also enables the web brake 53 (FIG. 1) to clamp the adjoining portion of the web 35 and arrest the linear movement of the web past the splicing station 43. This same machine cycle count also performs the further and very important function of sending a signal from the controller 64 through the conductors 88 to the electromagnetic brake (not shown) on the unwinding reel 12 (FIG. 1). In this way, the electromagnetic brake maintains tension on the web 35 for two purposes. First, the electromagnetic brake stops the reel 12 from spinning, or free-wheeling and unwinding any more of the web from the balance of the roll remaining on the axle 14. Second, the tension established in the web 37 between the electromagnetically braked reel 12 and the brake 53 insures that the web 35 will be cleanly severed from that portion of the web that is held between the film pads 45,46.

Well before the activation of the warning light 65 signalling the start of a splicing sequence, the machine attendant prepares the leading edge of the web 47 from the fresh roll of labels for splicing by applying the adhesive splicing strip (not shown) to the leading label in the web 47 in a manner that will establish slight overlap between the edges of the leading label in the web 47 and the counterpart label to which it is to be joined in the web 35. The tape should protrude forward of the edge of the leading label. Further in this regard, the adhesively coated side of the tape should face toward the running web 35 and the surface of the tape that is free of adhesive should bear against and be held by suction, on the horizontal surface of the lower film pad 46.

The reel feed select switch 86 (FIG. 4) should be manipulated to complete electrical continuity through the conductor 90 to indicate to the controller 64 that the replacement web is the web 47 (FIG. 1) that is drawn from the reel 11.

Preparations for the actual splice earlier having been made by the attendant, the controller 64 continues to respond to the primary count signal in the conductor 100 at the time the controller stopped the movement of the web 35 as described above. Thus, the controller 64 sends a signal through the conductor 75 that enables the pneumatic ram 44 to drive, in a vertically downward direction, the upper film pad 45 in order to press the now stationary adjoining portion of the depleted web 35 past the web cutter 50.

In this manner, the upper film pad 45 also becomes a shear bar that severs the web 35 at the cutter 50. The upper film pad 45 also compresses the portion of the now severed web, held by suction to the vertically moving upper film pad 45, against the exposed adhesively covered portion of the strip that is joined to the leading label on the replacement web 47. At this point, the particular importance of the tension established in the web 35 by the activated electromagnetic brake for the reel 12 and the brake 53 can be understood. The tension thus established in the web 35 insures clean separation in the web at the line of severance.

Meanwhile, labels in the predetermined length of the web 35 between the brake 53 and the label application machine 91 (FIG. 3) are continuing to feed through to the label application machine to permit uninterrupted movement of the articles 70 in the production line 67.

The controller 64 (FIG. 4) establishes a splicing dwell time of about 0.5 seconds to insure that a firm junction has been formed between the now terminal portion of the web 35 and the slightly overlapping leading label in the web 47 through the adhesive strip. At the end of this dwell time, the controller 64 (FIG. 4) sends a further signal through the conductor 75 to enable the pneumatic ram 44 and the attached upper film pad 44 to retract upwardly and thus disengaging the film pads 45, 46.

Appropriate signals also are sent through the conductor 74 to deactivate the warning light 65 and through the conductors 77 and 88 to release the pneumatic brake cylinder 54 and the electromagnetic brake associated with the reel 12. A signal from the controller 64 in the conductor 76 then permits the pneumatic cylinder 23 to draw the roller 25 downwardly and thereby release the dancer arm 26 to move the attached roller 32 arcuately with respect to the pivot 30 under the force of gravity, thereby to suitably tension the now spliced web moving over the roller 32.

Although the spliced web now is moving freely through the splicing apparatus, the label application machine 91 (FIG. 3) continues to send a counting pulse for each machine cycle through the conductor 100 (FIG. 4) along with a signal in the conductor 101 that indicates application of labels to the articles in the production line 67 is continuing. The controller 64 registers these further counts and, after a predetermined number of these counts have been received that correspond to the number of labels in the web at the time the web was spliced between the label application machine 91 and the spliced label, the controller sends a signal through the conductor 83 that activates the pneumatic ejection cylinder 72, as best shown in FIG. 3. The ejection cylinder 72, within about 0.2 seconds, drives the article 71 in the production line 67 out of the line, without disturbing that line, and into a discharge chute to enable an attendant to remove the undesirable label from the article 71 and then replace that article back in the production line for relabelling.

To avoid impeding production, the ejection cylinder 72 retracts its piston rod, which is drawn away from the production line 67 to await a further ejection command from the controller 64.

As the article 72 is being ejected from the production line 67, the controller 64 (FIG. 1) sends a further signal through the conductor 89 to the label application machine 91. This further signal restores the machine speed to a full, high speed operation that will continue until the roll of labels in the web 47 is depleted.

Upon depletion of the label roll on the reel 11, the process is essentially repeated, except for the depletion of the roll of labels on the reel 11, which formerly had been the fresh roll, and the need to splice the web from the reel 11 to the leading label from the now fresh roll that is mounted the reel 12.

In this circumstance, the reel feed selector switch 86 is shifted to contact the conductor 90. With this configuration, the adhesive surface of the strip is applied to the leading label in the web from the fresh roll on the reel 12, the exposed adhesive portion of the strip being oriented toward the lower film pad 46. The non-adhesive side of the strip and a portion of the leading label in the web from the reel 12 being held by suction against the lower surface of upper film pad 45.

Because the web 47 was drawn across the upper surface of the lower film pad 46 until arrested by the braking and web tensioning action described above, the controller 64 sends a signal through the conductor 82 that drives the lower film pad 46 and the portion of the web borne thereon upwardly. Thus, the lower film pad 46 shears the web at the cutter 50 and presses the sheared web against the adhesive on the tape and a slightly overlapping portion of the leading label in the web on the reel 12. Of course, it should be noted that the tension in the web from the reel 11 is provided by energizing an electromagnetic brake (not shown) that is associated with the reel 11.

The lower film pad 46 is restored, through appropriate commands from the controller 64, and operation of both the splicer and the label application machine continue as described above.

Thus, there is provided a label splicing apparatus that is easy to operate and maintain, has few moving parts,and that does not require the full time attention of an attendant. Further in this regard, apparatus that characterizes the invention signals the approaching depletion of a roll of labels, splices in registration a fresh roll of labels to one of the last labels in a roll that has been exhausted and automatically discharges from a production line an article to which a spliced label has been applied.

There are, moreover, several additional features of the invention that are of significance. For example, the safety guard 68 is provided to protect the attendant when setting up a splice. The controller automatically deactivates the apparatus when the safety guard is engaged through a signal in the conductor 92.

Should the machine attendant set up the splice improperly with the fresh label web out of registration, a separate controller, i.e., TRINE #1520 Registration Controller, will receive a signal that reflects the lack of registration in the succeeding label web and terminate operation of the label machine. The #1520 controller in this circumstance sends a signal to deactivate the label application machine 91. This assures that an unattended machine will not produce unacceptable product, even if the attendant set up the splice improperly.

What is claimed is:

1. An apparatus for splicing the leading label in a web of labels to a label in a running web of labels drawing from a roll of labels that are being applied to articles in a production line comprising: a reel for supporting the rolled web of labels for rotation thereon; another reel for supporting the running rolled web of labels for rotation thereon; a photosensitive device associated with said another reel and responsive to light reflected from said rolled running web of labels for generating a signal that corresponds to the depletion of the running web of labels; a controller coupled to said photosensitive device for controlling the speed of the running web; a brake for stopping the movement of at least a portion of the running web; further brake means coupled to said another reel for establishing a tension in the running web between said brake and said another reel; a dancer arm for establishing tension in the running web in the portion of the running web that extends beyond said brake, the running web engaging said dancer arm; means responsive to said controller for moving said dancer arm to a predetermined position in order to establish a specific length of the running web for registering the leading label in the web of labels with the labels in the running web; means for generating signals that correspond to the labels that are applied to the articles in the production line; means for transmitting said signals to said controller, said controller counting said labels to identify the label that is spliced to the running web; and ejection means coupled to said controller for removing the article in the production line to which the spliced label is applied.

* * * * *